United States Patent
Bilgin et al.

(10) Patent No.: US 12,111,934 B2
(45) Date of Patent: Oct. 8, 2024

(54) METHODS OF EVALUATING SOURCE CODE USING NUMERIC ARRAY REPRESENTATIONS OF SOURCE CODE ELEMENTS

(71) Applicant: Telefonaktiebolaget LM Ericsson (publ), Stockholm (SE)

(72) Inventors: Zeki Bilgin, Istanbul (TR); Elif Ustundag Soykan, Istanbul (TR); Mehmet Akif Ersoy, Istanbul (TR); Emrah Tomur, Izmir (TR); Pinar Comak, Ankara (TR); Leyli Karacay, Istanbul (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 17/797,747

(22) PCT Filed: Feb. 10, 2020

(86) PCT No.: PCT/EP2020/053335
§ 371 (c)(1),
(2) Date: Aug. 5, 2022

(87) PCT Pub. No.: WO2021/160242
PCT Pub. Date: Aug. 19, 2021

(65) Prior Publication Data
US 2023/0252161 A1    Aug. 10, 2023

(51) Int. Cl.
*G06F 21/57* (2013.01)
*G06F 8/41* (2018.01)

(52) U.S. Cl.
CPC .......... *G06F 21/577* (2013.01); *G06F 8/427* (2013.01)

(58) Field of Classification Search
CPC .......... G06F 8/427; G06F 8/42; G06F 21/577; G06F 8/31; G06F 11/3664;
(Continued)

(56) References Cited

U.S. PATENT DOCUMENTS

| 11,586,437 B1 * | 2/2023 | Tripp ........................ G06F 9/54 |
| 2015/0082276 A1 | 3/2015 | Balachandran |

(Continued)

OTHER PUBLICATIONS

International Search Report and Written Opinion of the International Searching Authority, PCT/EP2020/053335, mailed Nov. 11, 2020, 11 pages.
(Continued)

*Primary Examiner* — Ali S Abyaneh
(74) *Attorney, Agent, or Firm* — Sage Patent Group

(57) ABSTRACT

Source code evaluation is provided. The source code includes a plurality of source code elements, and one of the source code elements is selected. A plurality of tokens is generated based on the source code element, and a binary AST representation is generated based on the plurality of tokens. The binary AST representation includes a plurality of binary AST nodes including binary AST token and null nodes. Each of the binary AST token nodes is based on a respective one of the plurality of tokens. Each of the binary AST token and null nodes is encoded into a respective numeric value. A numeric array representation of the source code element is generated based on the binary AST representation. The numeric values are mapped to locations in the numeric array representation based on respective locations of the binary AST token and null nodes in the binary AST representation.

24 Claims, 17 Drawing Sheets

(58) Field of Classification Search
CPC ...... G06F 11/3668; G06F 40/205; G06F 8/77; G06F 11/362; G06F 11/3624; G06F 8/41
See application file for complete search history.

(56) References Cited

U.S. PATENT DOCUMENTS

| | | |
|---|---|---|
| 2015/0135166 A1 | 5/2015 | Tarlow |
| 2021/0117551 A1* | 4/2021 | Maekawa ............. G06F 21/568 |
| 2022/0067538 A1* | 3/2022 | Choudhary ............. G06F 8/433 |
| 2024/0045971 A1* | 2/2024 | Ben Salem ............. G06F 21/54 |

OTHER PUBLICATIONS

Dam Hoa Khanh et al, "Lessons Learned from Using a Deep Tree-Based Model for Software Defect Prediction in Practice", 2019 IEEE/ACM 16th International Conference on Mining Software Repositories (MSR), IEEE,May 25, 2019 (May 25, 2019), p. 46-57, XP033608225, 12 pages.

Nguyen Anh Tuan et al, "A deep neural network language model with contexts for source code", 2018 IEEE 25th International Conference on Software Analysis, Evolution and Reengineering (SANER), IEEE,Mar. 20, 2018 (Mar. 20, 2018), p. 323-334, XP033343057, 12 pages.

Russell, R. L., et al., "Automated Vulnerability Detection in Source Code Using Deep Representation Learning," Proceedings of the 17th IEEE International Conference on Machine Learning and Applications (IEEE ICMLA 2018,) Dec. 17-20, 2018, Orlando, Florida, USA, 7 pages.

* cited by examiner

Figure 3

```
int main()
{                   // This is main function
  int a1 = 5;       // Define an integer variable with an assigned value of 5
  printf(a1);       // print the value kept by variable a1
} int max(int num1, int num2)    // A function named max, which takes
                                  two arguments as input
{
  int result;              // Define an integer variable
  if (num1 > num2)         // if condition comparing given two numbers
    result = num1;
  else
    result = num2;
  return result;           // returns greater number
}
```

Figure 4A

```
int main(){  // This is main function
      int a1 = 5;  // Define an integer variable
      printf(a1);  // print the value kept by variable a1
      }
```

Figure 4B

```
int max(int num1, int num2) {  // A function named max, which takes two arguments as input
   int result; // Define an integer variable
   if (num1 > num2) // if condition comparing given two numbers
      result = num1;
   else
      result = num2;
   return result;  // return greater number
}
```

Figure 7B

| Token | | Encoded Value |
|---|---|---|
| *FuncDef* | | *2.0,0.0,0.0* |
| *Decl* | | *3.0,0.0,0.0* |
| *FuncDecl* | | *4.0,0.0,0.0* |
| *TypeDecl* | | *5.0,0.0,0.0* |
| *IdentifierType* | string | *6.0,0.0,101.0* |
| | char | *6.0,0.0,102.0* |
| | int | *6.0,0.0,103.0* |
| | float | *6.0,0.0,104.0* |
| | void | *6.0,0.0,146.0* |
| | unsigned char | *6.0,150.0,102.0* |
| | signed float | *6.0,158.0,104.0* |
| | … | … |
| *Compound* | | *7.0,0.0,0.0* |
| *BinaryOp* | < | *14.0,120.0,0.0* |
| | > | *14.0,121.0,0.0* |
| | <= | *14.0,122.0,0.0* |
| | >= | *14.0,123.0,0.0* |
| | == | *14.0,124.0,0.0* |
| | != | *14.0,125.0,0.0* |
| | … | … |
| | | |

| Category based on CWE ID | CWE Description |
|---|---|
| 119 | Improper Restriction of Operators within the Bounds of a Memory Buffer |
| 120/121/122 | Buffer Overflow |
| 469 | Use of Pointer Subtraction to Determine Size |
| 476 | NULL Pointer Dereference |
| 20, 457, 805 etc | Improper Input Validation, Use of Uninitialized Variable, Buffer Access with Incorrect Length Value etc. |

Figure 10

| Class | Training (The number of samples) | | Test (The number of samples) | |
|---|---|---|---|---|
| | Vulnerable | Not Vulnerable | Vulnerable | Not Vulnerable |
| CWE119 | 2684 | 2684 | 335 | 335 |
| CWE120 | 5119 | 5119 | 641 | 641 |
| CWE469 | 323 | 323 | 36 | 36 |
| CWE476 | 1160 | 1160 | 146 | 146 |
| CWEother | 3294 | 3294 | 419 | 419 |

Figure 12

| Class | Training (sample size = 121700) | | Test (sample size = 15118) | |
|---|---|---|---|---|
| | Vulnerable | Not Vulnerable | Vulnerable | Not Vulnerable |
| CWE119 | 2684 (2.21%) | 119016 (97.79%) | 335 (2.22 %) | 14783 (97.78%) |
| CWE120 | 5119 (4.21%) | 116581 (95.79%) | 641 (4.24 %) | 14477 (95.76%) |
| CWE469 | 323 (0.27%) | 121377 (99.73%) | 36 (0.24 %) | 15082 (99.76%) |
| CWE476 | 1160 (0.95%) | 120540 (99.05%) | 146 (0.97 %) | 14972 (99.03%) |
| CWEother | 3294 (2.71%) | 118406 (97.29%) | 419 (2.77 %) | 14699 (97.23%) |

METHODS OF EVALUATING SOURCE CODE USING NUMERIC ARRAY REPRESENTATIONS OF SOURCE CODE ELEMENTS

CROSS REFERENCE TO RELATED APPLICATIONS

This application is a 35 U.S.C. § 371 national stage application of PCT International Application No. PCT/EP2020/053335 filed on Feb. 10, 2020, the disclosure and content of which is incorporated by reference herein in its entirety.

TECHNICAL FIELD

The present disclosure relates generally to software, and more particularly to methods of evaluating source code and related nodes.

BACKGROUND

Uses of Artificial Intelligence (AI), and particularly Machine Learning (ML), have been rising. AI and ML have found places in almost in every area of life. One promising application area for AI/ML is intelligent software analysis with various objectives such as vulnerability prediction, source code review and completion, synthesis, repairs and more.

ML models are trained and developed over only numerical data in the form of an array(s). For example, consider the task of image classification by ML. Images are made up of pixels, the smallest part of an image, where each pixel has its own color that is represented with a number between 0 and 256 in a grey color system. Thus, an image is in fact regarded as a matrix, from the perspective of a ML model, comprising numerical values.

On the other hand, source code is mostly written in high-level programming languages (such as Java, Python, etc.) including text-based keywords, words and phrases from English (or other) natural languages. Therefore, a piece of source code written in a high-level language may be difficult to process directly using ML models.

SUMMARY

According to some embodiments of inventive concepts, a method providing evaluation of source code of a programming language includes the following operations. The source code of the programming language is provided, wherein the source code includes a plurality of source code elements. A source code element is selected from the plurality of source code elements of the source code. A plurality of tokens are generated based on the source code element, wherein each token of the plurality of tokens comprises a sequence of text characters. A binary Abstract Syntax Tree (AST) representation of the source code element is generated based on the plurality of tokens of the source code element, wherein the binary AST representation comprises a plurality of binary AST nodes including binary AST token nodes and binary AST null nodes, wherein each of the binary AST token nodes is based on a respective one of the plurality of tokens of the source code element. Each of the binary AST token nodes and binary AST null nodes is encoded into a respective numeric value. A numeric array representation of the source code element is generated based on the binary AST representation, wherein the numeric values for the respective binary AST token nodes and binary AST null nodes are mapped to locations in the numeric array representation based on respective locations of the binary AST token nodes and binary AST null nodes in the binary AST representation.

According to some other embodiments of inventive concepts, a source code evaluation node is adapted to perform the following operations. The source code of the programming language is provided, wherein the source code includes a plurality of source code elements. A source code element is selected from the plurality of source code elements of the source code. A plurality of tokens are generated based on the source code element, wherein each token of the plurality of tokens comprises a sequence of text characters. A binary Abstract Syntax Tree (AST) representation of the source code element is generated based on the plurality of tokens of the source code element, wherein the binary AST representation comprises a plurality of binary AST nodes including binary AST token nodes and binary AST null nodes, wherein each of the binary AST token nodes is based on a respective one of the plurality of tokens of the source code element. Each of the binary AST token nodes and binary AST null nodes is encoded into a respective numeric value. A numeric array representation of the source code element is generated based on the binary AST representation, wherein the numeric values for the respective binary AST token nodes and binary AST null nodes are mapped to locations in the numeric array representation based on respective locations of the binary AST token nodes and binary AST null nodes in the binary AST representation.

According to still other embodiments of inventive concepts, a source code evaluation node includes processing circuitry and memory coupled with the processing circuitry. The memory includes instructions that when executed by the processing circuitry causes the source code evaluation node to perform the following operations. The source code of the programming language is provided, wherein the source code includes a plurality of source code elements. A source code element is selected from the plurality of source code elements of the source code. A plurality of tokens are generated based on the source code element, wherein each token of the plurality of tokens comprises a sequence of text characters. A binary Abstract Syntax Tree (AST) representation of the source code element is generated based on the plurality of tokens of the source code element, wherein the binary AST representation comprises a plurality of binary AST nodes including binary AST token nodes and binary AST null nodes, wherein each of the binary AST token nodes is based on a respective one of the plurality of tokens of the source code element. Each of the binary AST token nodes and binary AST null nodes is encoded into a respective numeric value. A numeric array representation of the source code element is generated based on the binary AST representation, wherein the numeric values for the respective binary AST token nodes and binary AST null nodes are mapped to locations in the numeric array representation based on respective locations of the binary AST token nodes and binary AST null nodes in the binary AST representation.

According to yet other embodiments of inventive concepts, a computer program includes program code to be executed by processing circuitry of a source code evaluation node, whereby execution of the program code causes the source code evaluation node to perform the following operations. The source code of the programming language is provided, wherein the source code includes a plurality of source code elements. A source code element is selected from the plurality of source code elements of the source code. A plurality of tokens are generated based on the source code element, wherein each token of the plurality of tokens comprises a sequence of text characters. A binary Abstract Syntax Tree (AST) representation of the source code element is generated based on the plurality of tokens of the source code element, wherein the binary AST representation comprises a plurality of binary AST nodes including binary AST token nodes and binary AST null nodes, wherein each of the binary AST token nodes is based on a respective one of the plurality of tokens of the source code element. Each of the binary AST token nodes and binary AST null nodes is encoded into a respective numeric value. A numeric array representation of the source code element is generated based on the binary AST representation, wherein the numeric values for the respective binary AST token nodes and binary AST null nodes are mapped to locations in the numeric array representation based on respective locations of the binary AST token nodes and binary AST null nodes in the binary AST representation.

According to further embodiments of inventive concepts, a computer program product includes a non-transitory storage medium including program code to be executed by processing circuitry of a source code evaluation node, whereby execution of the program code causes the source code evaluation node to perform the following operations. The source code of the programming language is provided, wherein the source code includes a plurality of source code elements. A source code element is selected from the plurality of source code elements of the source code. A plurality of tokens are generated based on the source code element, wherein each token of the plurality of tokens comprises a sequence of text characters. A binary Abstract Syntax Tree (AST) representation of the source code element is generated based on the plurality of tokens of the source code element, wherein the binary AST representation comprises a plurality of binary AST nodes including binary AST token nodes and binary AST null nodes, wherein each of the binary AST token nodes is based on a respective one of the plurality of tokens of the source code element. Each of the binary AST token nodes and binary AST null nodes is encoded into a respective numeric value. A numeric array representation of the source code element is generated based on the binary AST representation, wherein the numeric values for the respective binary AST token nodes and binary AST null nodes are mapped to locations in the numeric array representation based on respective locations of the binary AST token nodes and binary AST null nodes in the binary AST representation.

According to some embodiments of inventive concepts, more efficient evaluation of source code may be facilitated by generating a binary Abstract Syntax Tree representation for a source code element, and using the binary AST representation to generate a numeric array representation of the source code element. Such operations may facilitate evaluation of the source code element, for example, using Machine Learning (ML) to provide one or more of vulnerability prediction, code review, code completion, synthesis, repairs, etc.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a table illustrating a piece of source code including two source code elements according to some embodiments of inventive concepts;

FIGS. 4A and 4B are tables illustrating two source code elements extracted from the source code of FIG. 3 according to some embodiments of inventive concepts;

FIG. 7B is a table illustrating encodings of AST nodes to numeric values according to some embodiments of inventive concepts;

FIG. 8C illustrates a numeric array representation of the binary AST of FIG. 7A based on the encodings of FIG. 7B according to some embodiments of inventive concepts;

FIG. 9 is a table illustrating software vulnerabilities according to some embodiments of inventive concepts;

FIG. 10 is a table illustrating aspects of a balanced subset of evaluation data for different software vulnerabilities according to some embodiments of inventive concepts;

FIG. 12 is a table illustrating aspects of an unbalanced subset of evaluation data for different software vulnerabilities according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 15:
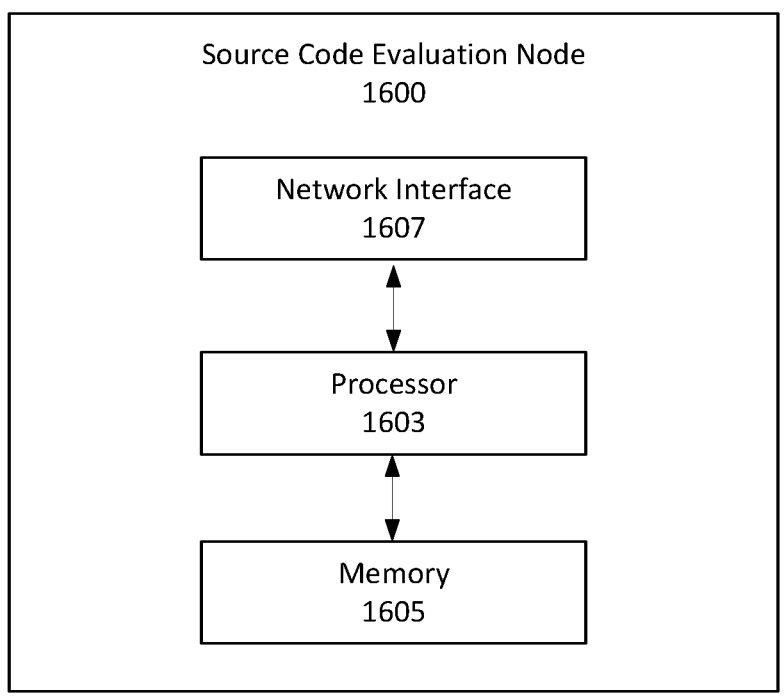
FIG. 15 is a block diagram illustrating a source code evaluation node according to some embodiments of inventive concepts.

FIG. 15 is a block diagram illustrating elements of a source code evaluation node configured to provide source code evaluation according to some embodiments of inventive concepts. As shown, the source code evaluation node may include network interface circuitry 1607 (also referred to as a network interface) configured to provide communications with other nodes. The source code evaluation node may also include a processing circuitry 1603 (also referred to as a processor) coupled to the network interface circuitry, and memory circuitry 1605 (also referred to as memory) coupled to the processing circuitry. The memory circuitry 1605 may include computer readable program code that when executed by the processing circuitry 1603 causes the processing circuitry to perform operations according to embodiments disclosed herein. According to other embodiments, processing circuitry 1603 may be defined to include memory so that a separate memory circuitry is not required.

As discussed herein, operations of the source code evaluation node may be performed by processing circuitry 1603 and/or network interface circuitry 1607. For example, processing circuitry 1603 may control network interface circuitry 1607 to communicate with one or more other nodes. Moreover, modules may be stored in memory 1605, and these modules may provide instructions so that when instructions of a module are executed by processing circuitry 1603, processing circuitry 1603 performs respective operations (e.g., operations discussed below with respect to FIG. 16).

Source code cannot be directly executed by processors in a computer architecture. There are compilers or interpreters, which are kinds of computer programs, that process source code and translate the source code into low-level programming languages (e.g., assembly language, object code, or machine code) that are more appropriate to be executed by instructions in a computer architecture. In this process of compiling source code, there are several intermediate steps where source code elements are exposed to different procedures, such as lexical analysis, parsing, abstract syntax tree (AST) representation, etc.

In lexical analysis, a source code element is transformed into a series of tokens, by discarding any whitespace or comments in the source code. For example, in C language, the source code element (also referred to as a line of source code) given below, int a=5; // This is a comment!

produces the following sequence of tokens, int (keyword), a (identifier), =(operator), 5 (constant), ; (symbol).

Figure 1:
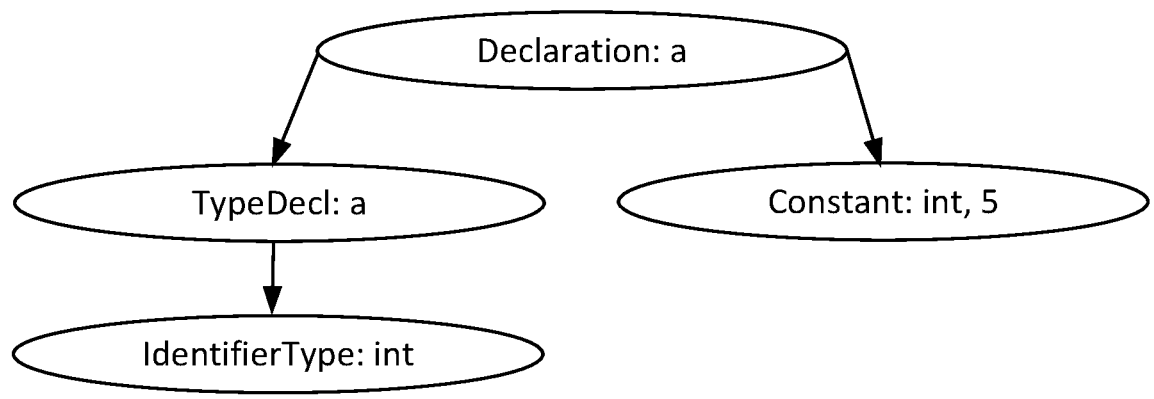
FIG. 1 is a diagram illustrating an example of a non-binary AST for a source code element.

In a parsing process, the tokens generated in lexical analysis are converted into a data structure (mostly a kind of rooted parse tree or other hierarchical structure) giving a structural representation of the input while checking for correct syntax based on the rules of a context-free grammar (CFG). This step can yield a non-binary Abstract Syntax Tree (AST) representation of the given source code element, which is a type of data structure in a rooted tree form based on the tokens extracted in lexical analysis. For example, a non-binary AST of the source code element given above may be provided as shown in FIG. 1 which illustrates a non-binary AST of the source code element: "int a=5; // This is a comment!"

A non-binary AST may be a useful representation of a source code element because it includes both syntax and semantic information related to the source code element.

Source code elements may be examined for several reasons, some of which include vulnerability detection or prediction, source code review and completion, converting to another language, synthesis, repairs, and more. In terms of vulnerability detection, there have been two main approaches to perform some analyses on source code elements against potential vulnerabilities (also referred to as bugs). These include (i) Static Code Analyses and (ii) Dynamic Code Analyses. In static code analyses, source code elements are directly analyzed without executing them, whereas in dynamic analysis, source code elements are executed with a specific set of inputs and their behaviors are observed for the intended objective. There are open source and commercial tools for both methods of analysis.

On the other hand, with the advent of Artificial Intelligence (AI) and Machine Learning (ML) techniques, there are now growing trends and research activities on how to leverage advanced capabilities of AI/ML to provide intelligent software analysis. More particularly, there is interest in automatic prediction of potential software vulnerabilities prior to their release by employing AI/ML.

Machine Learning algorithms may only accept numerical inputs for the purpose of training and developing a model. Validation and test data should also be numerical. However, source code elements are mostly written in high-level programming languages, comprising elements that are not in appropriate form to be directly processed by ML algorithms and models. As a result, source code may need to be pre-processed according to some embodiments of inventive concepts before feeding into ML models.

Most prior studies in the literature borrow some methods from Natural Language Processing (NLP) techniques to process source code elements for ML applications as discussed, for example, by Russell et al. in the publication "Automated Vulnerability Detection in Source Code Using Deep Representation Learning" (cited below as Reference [1]). One of the well-known methods in this category is Bag-of-Words (BoW), where each word is tagged with a numeric value, and then the number of occurrences is calculated for each word and phrase to perform some further analyses. However, in this approach, semantic information in the source code element may be lost, and therefore, these methods may not be able to characterize the source code element well enough.

Another approach for source code processing is to use a non-binary AST representation of a source code element, which is a tree-based data structure of the source code element after being tokenized in a compiler or lexer/parser. A non-binary AST includes rich information about the original source code element both in terms of semantic and syntax information. Therefore, a non-binary AST representation may be useful for ML applications. A non-binary AST by itself, however, may not be appropriate to feed ML algorithms directly, because it is based on tokens of the source code element.

One promising use case of leveraging ML techniques for software analysis is vulnerability prediction. Predicting potential vulnerabilities in source code elements may be useful, and its potential advantages are discussed in greater detail below. Traditional methods such as Static Code Analysis and Dynamic Code Analysis have their pros and cons. In static code analysis tools, targeted vulnerabilities are formalized, and rules are defined to detect them, which may require hand-engineering. However, there may be too many false positives and a majority of critical vulnerabilities may not be detected by most of the static analysis tools. On the other hand, dynamic analysis may require running source code elements and observing behavior to detect some vulnerabilities, which may be time consuming and/or likely to fail since it may be difficult to try and test all possible sets of inputs.

There are efforts and trends investigating how to leverage AI/MIL techniques to predict potential vulnerabilities in source code elements before their release. This may be important because certain vulnerabilities may cause devastating losses in business. In this area, a problem, which is not completely solved yet, is how to represent source code elements appropriately to feed ML algorithms. This may be useful/required because ML algorithms may accept only numerical data to perform training and test tasks. However, source code elements are just strings including letters, characters, numbers, operators, etc. Therefore, it may not be possible to directly input source codes to ML algorithms.

According to some embodiments of inventive concepts, methods are provided to translate source code elements into a numeric array representation that enables leveraging Machine Learning techniques to perform intelligent analysis on the source code. In such methods, an non-binary Abstract Syntax Tree (AST) representation (which is a tree-type data structure based on the tokens extracted) of a given source code element is first obtained via a parser. Then, the obtained non-binary AST is converted to complete binary AST in which every node other than the leaves has two children. Later, the nodes in this complete binary abstract syntax tree structure are encoded into predefined numeric values (also referred to as numeric keys) along with auxiliary data associated with each node. Finally, the resulting numerically tagged binary AST is converted to an array by mapping nodes into immutable consistent locations (indexes) in the array depending on the location of each node in the binary AST.

In addition, proposed methods have been implemented, and experiments have been performed to predict vulnerabilities in source code elements using ML. Initial experimental results appear to be promising and indicate that the presented source code element representation method may be capable of characterizing some/all vulnerabilities considered in the experiments.

According to some embodiments of inventive concepts, data driven techniques (e.g., AI/ML) are leveraged to perform intelligent analysis directly on source code elements, including but not limited to vulnerability prediction, code review, code completion, synthesis, repairs, and more. A use case for vulnerability prediction is given in the present disclosure with experimental results. With regard to other use cases, it may be determined whether there are any missing parts in the tree by checking an AST of a source code element. If there is, models disclosed herein may offer what child nodes could be inserted in the missing parts. This example can be applied also for a use case 'code repair'.

According to some embodiments of inventive concepts, a language independent method is provided and is applied for any high-level programming language.

According to some embodiments of inventive concepts, a need for domain expert and/or hand-engineering to perform specific analysis is reduced/eliminated by paving the way for data driven techniques (e.g., AI/ML). For example, it is experimentally shown that it is possible to perform vulnerability prediction even without knowing details of the targeted vulnerabilities.

According to some embodiments of inventive concepts, the development of ML-based models and/or tools may be improved/optimized according to an intended objective(s).

According to some embodiments of inventive concepts, ways to perform predictive analysis are provided.

According to some embodiments of inventive concepts, a numerical vectoral representation of a given source code element may be provided while preserving semantic information.

According to some embodiments of inventive concepts, performance of automated code analyses with various objectives (e.g., vulnerability detection) may be enabled. With the rise of Artificial Intelligence (AI), there is a trend to leverage Machine Learning (ML) and Data Mining techniques to perform some intelligent analysis on source code elements. For example, predicting potential software vulnerabilities beforehand in source code elements by using ML algorithms is a significant research area. However, how to do this is yet unclear, and a state-of-the-art approach for this purpose is not currently available. The difficulty may arise from a few factors, such as (i) a lack of useful and large enough datasets that are accurately labelled with identified vulnerabilities and (ii) a lack of effective methods to translate source code elements into a useful data format that can be directly used to train ML models. In fact, source code elements, which are inherently composed of words and phrases in their natural form, may not be appropriate to directly feed ML models because ML algorithms may be trained and developed only over numerical data in vectoral or matrix structure. In the present disclosure, methods are provided to translate source code elements into a useful vectoral structure including numerical values (e.g., including only numerical values), which may be appropriate to directly feed ML algorithms, while keeping semantic and syntactic information about the original source code element as much as possible. Moreover, proposed methods may be implemented and some experiments may be performed with the objective of vulnerability prediction over a large public dataset containing function-level source code elements labelled with known/certain vulnerability types. Thus, experimental results are presented that show feasibility of presented methods.

Figure 2:
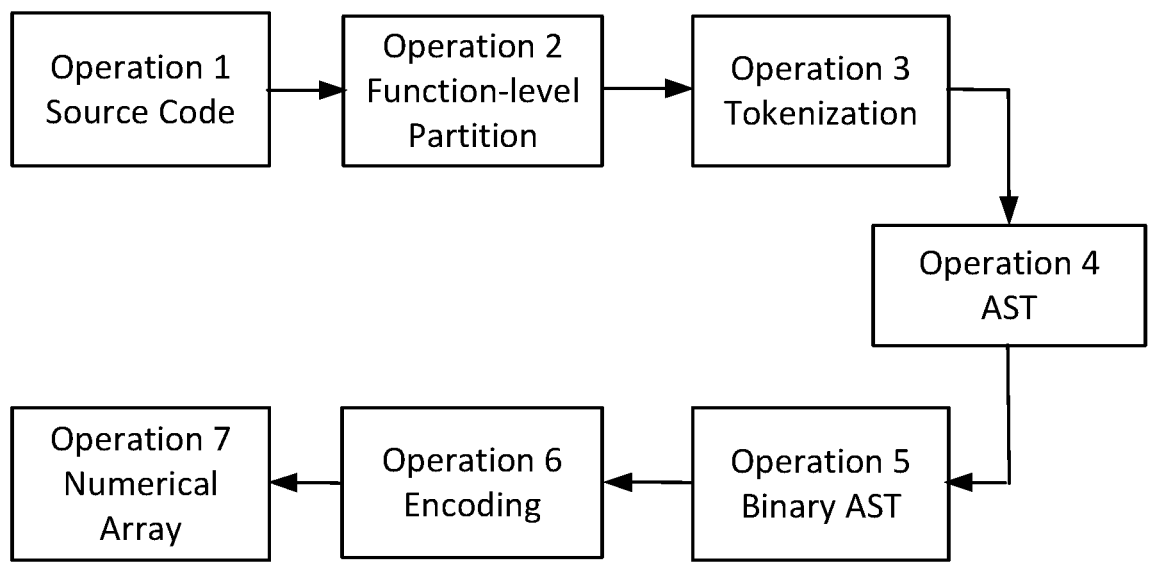
FIG. 2 is a diagram illustrating operations of methods according to some embodiments of inventive concepts.
Figure 14:
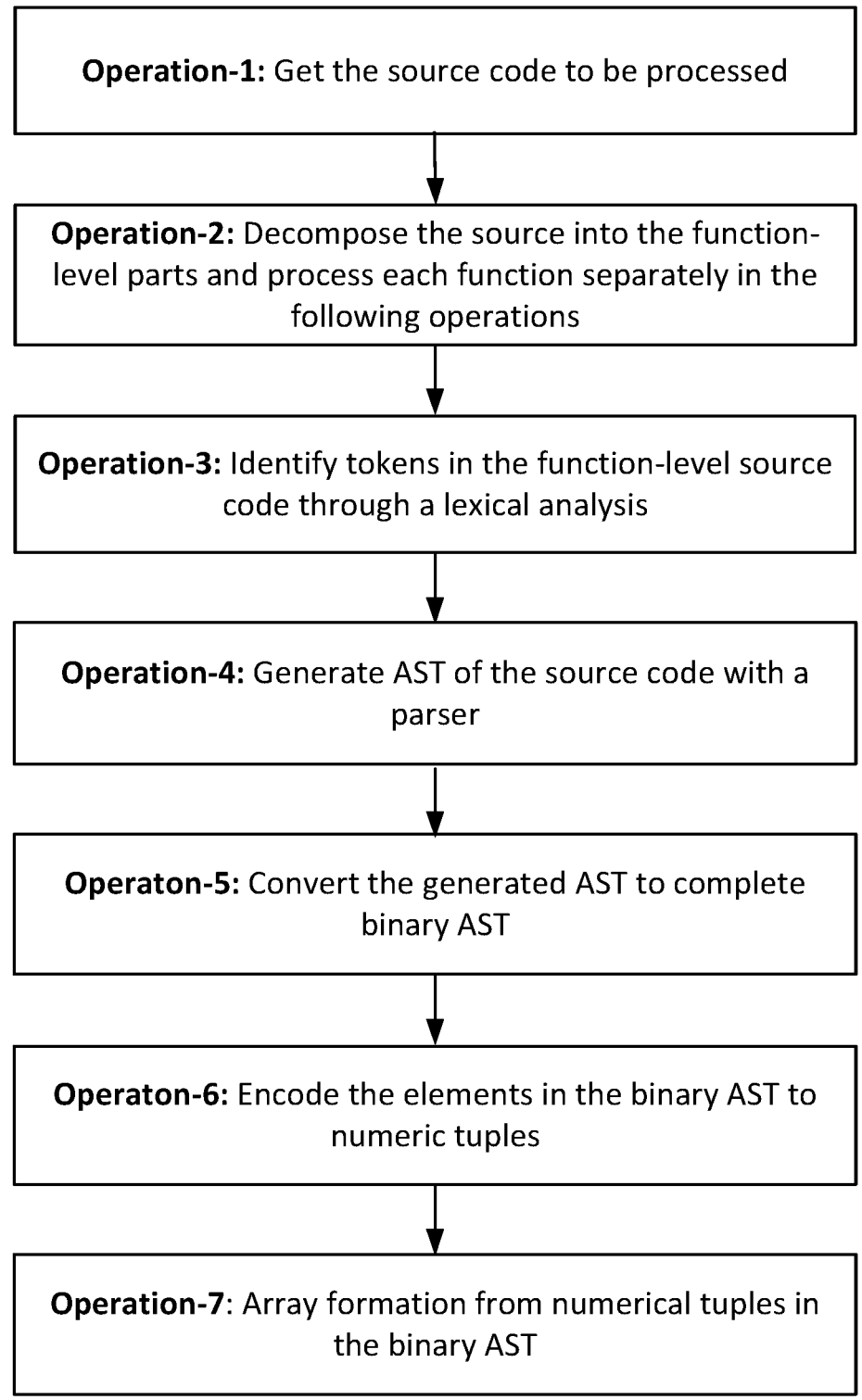
FIG. 14 is a flow chart illustrating operations according to some embodiments of inventive concepts.

FIG. 2 illustrates operations of methods according to some embodiments of inventive concepts, and these operations are also illustrated in flow chart of FIG. 14.

Operation 1 (Source Code): In operation 1, the source code to be processed is taken as input. The source code may be written in any high-level programming language. As an example, FIG. 3 illustrates a sample/piece of source code written in C language including two source code elements.

Operation 2 (Function-level partition): In operation 2, the source code of a program or application can be arbitrarily long in terms of the number of source code elements (also referred to as source code lines and/or source code functions defined). Therefore, a good practice may be to break the source code into function-level source code elements in order to increase granularity in processing as well as reduce/limit its size to some extent. This can be done manually or automatically by using parsers. Then, each source code element is processed separately in the following operations. After operation 2, the term "source code element" is used in the sense of a function-level source code element. FIGS. 4A and 4B illustrate the extraction of two source code elements (function-level source code elements) from the original source code of FIG. 3.

Operation 3 (Tokenization): In operation 3, the source code element (e.g., the main function of FIG. 4A) may be first cleaned by removing its unimportant portions of source code element such as comments, whitespaces, tabs, new lines, etc. Then, the remaining portion of the source code element is converted into a series of tokens, where a token is a sequence of text characters that can be treated as a unit in the grammar of the programming language. This can be achieved by using a lexer specifically developed for the language of the source code. By way of example, tokens of the main function of FIG. 4A may be given as follows: int (keyword), main (identifier), LPAREN (delimiter), RPAREN (delimiter), =(operator), 5 (constant), ; (symbol) . . . .

Figure 5:
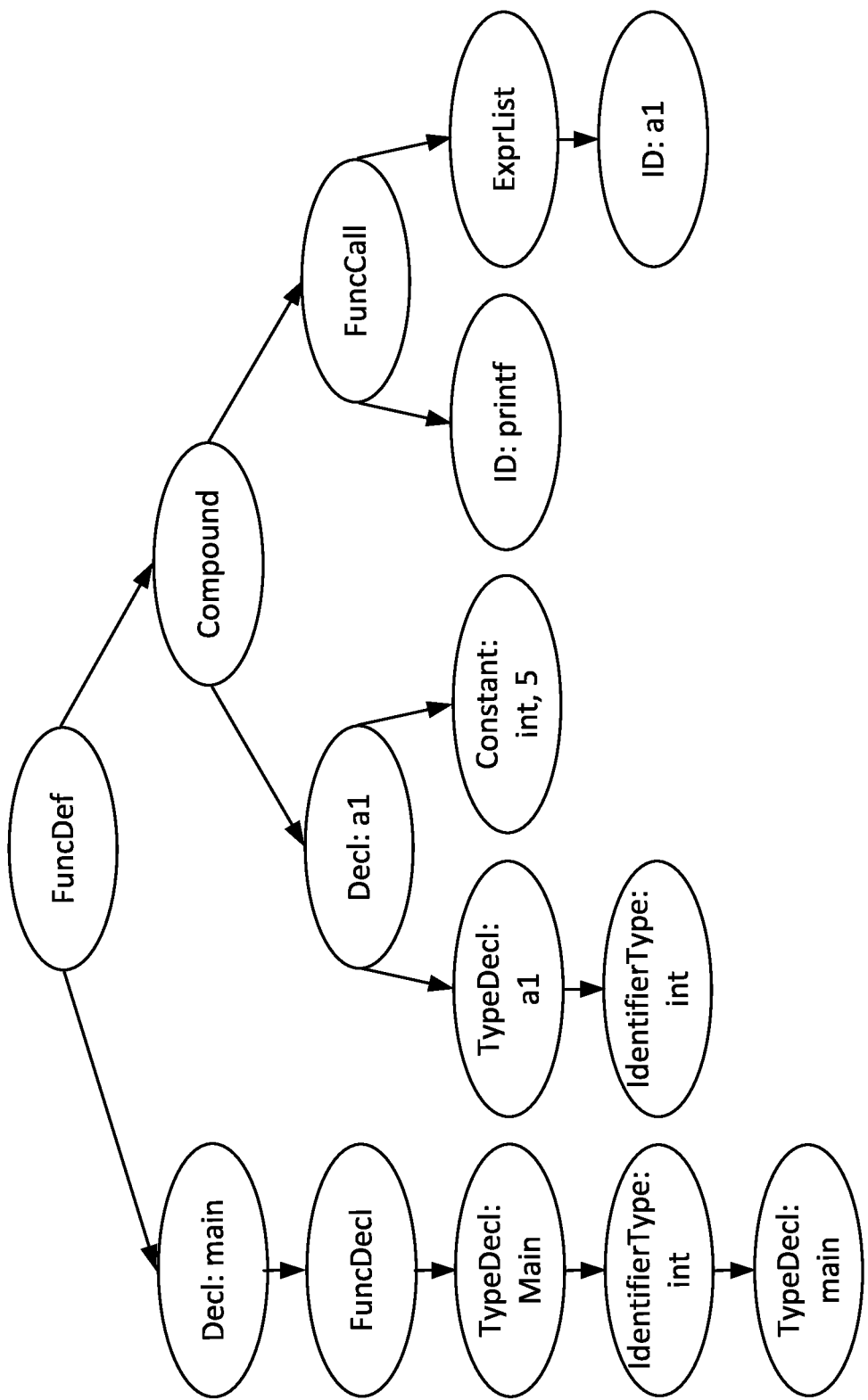
FIG. 5 is a diagram illustrating a non-binary AST of the source code element of FIG. 4A according to some embodiments of inventive concepts.

Operation 4 (non-binary AST Generation): In Operation 4, a non-binary AST of the source code element is generated, which can be achieved using a parser developed specifically for the language of the source code. A non-binary AST contains rich information about the source code element, including syntax and semantic information to some extent. Note that the nodes in a non-binary AST can have an arbitrary number of child nodes, which may make it difficult/impossible to estimate in advance the number of nodes that exist at a certain depth of the non-binary AST. This may be an issue while trying to map nodes of a non-binary AST into a fixed length array. An approach to address this issue is discussed below with respect to Operation 5. FIG. 5 illustrates a non-binary AST of the main function source code element of FIG. 4A. In the non-binary AST, each node is a token node corresponding to one of the tokens of the source code element, and each of the tokens of the source code element may be represented in a respective one of the nodes of the non-binary AST.

Operation 5 (Conversion to Complete Binary AST): Operation 5 may be important to enable assignment of elements (nodes) of a non-binary AST into a fixed length array consistently as described in the following operations. In a regular non-binary AST, the nodes can have an arbitrary number of child nodes, whereas the nodes in a binary AST can have at most two children, which are generally named as left-child and right-child. In operation 5, the regular non-binary AST is converted to complete binary AST, where all leaves (also referred to as terminal nodes) have the same depth and all internal nodes (also referred to as non-terminal nodes) have degree 2 (meaning that an internal node has two child nodes). There may be many alternative approaches to convert an m-ary non-binary abstract syntax tree to a binary abstract syntax tree, and any one of these approaches may be used in this operation. As an example, an approach based on the following two rules may be used to convert an m-ary non-binary abstract syntax tree to a corresponding complete binary abstract syntax tree:

1) The leftmost child of Node-x in the m-ary non-binary abstract syntax tree is assigned as right-child of Node-x in the corresponding complete binary abstract syntax tree, and
2) The right sibling of Node-x in the m-ary non-binary abstract syntax tree is assigned as left-child of Node-x in the corresponding complete binary abstract syntax tree.

Figure 6A:
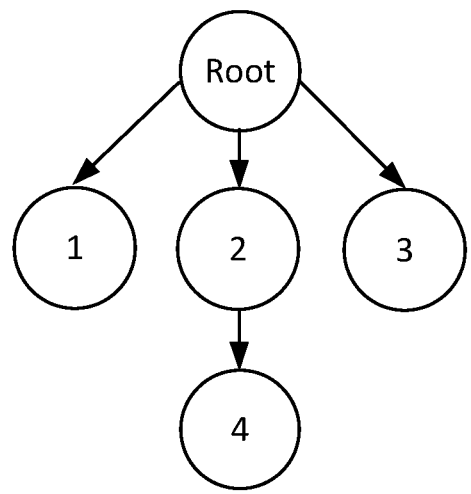
FIG. 6A is a diagram illustrating a non-binary tree and FIG. 6B is a diagram illustrating a binary tree derived from the non-binary tree of FIG. 6A according to some embodiments of inventive concepts.
Figure 6B:
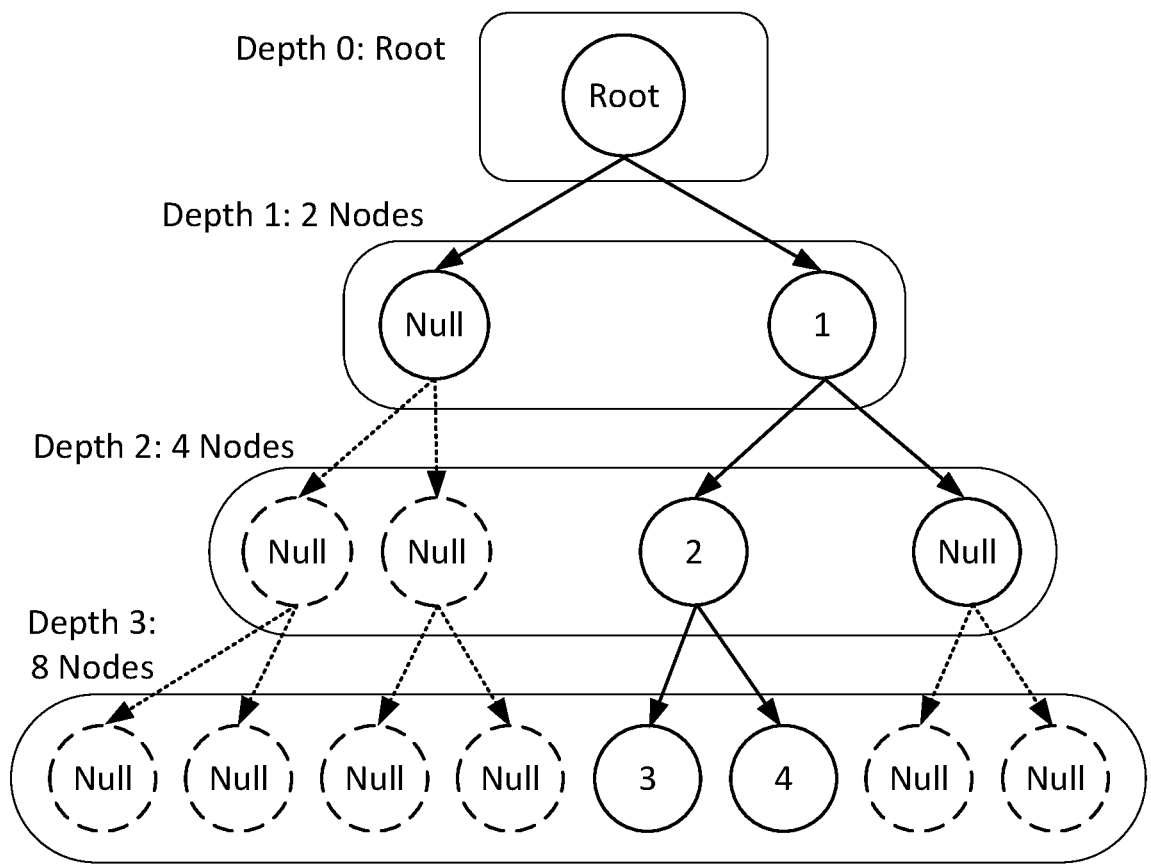

If Node-x (e.g., a binary AST token node corresponding to a node of the non-binary AST and to a token of the source code element) has no children, then its right-child becomes NULL (referred to as a binary AST null node), and if Node-x is the rightmost child of its parent, then its left-child becomes NULL (referred to as a binary AST null node). The examples of FIGS. 6A and 6B illustrate conversion of a regular m-ary non-binary abstract syntax tree to a complete binary abstract syntax tree according to some embodiments. Dashed NULL nodes (also referred to as a binary AST null node) are added to provide a complete binary abstract syntax tree. In such a complete binary AST, each level i includes $2^i$ nodes, so that each level is "complete."

By way of example, the regular m-ary non-binary abstract syntax tree illustrated in FIG. 6A may be provided at operation 4.

A corresponding complete binary abstract syntax tree may be provided at operation 5 as shown in FIG. 6B based on the given m-ary non-binary abstract syntax tree of FIG. 6A.

FIG. 6B thus illustrates a complete binary abstract syntax tree corresponding to the sample regular non-binary abstract syntax tree of FIG. 6A.

As discussed above, a complete binary abstract syntax tree may grow exponentially until all leaves becomes NULL. However, this may lead to a huge number of child nodes when the depth of the binary abstract syntax tree increases. Therefore, in some embodiments, it may be enough to consider the binary abstract syntax tree of a depth up to a threshold, which can be determined based on performance requirements. In empirical studies, a partial binary abstract syntax tree up to depth-12 may represent a whole binary abstract syntax tree to a sufficient extent. By setting a limit on a depth of the complete binary AST of Operation 5, a size of the complete binary AST (including a total number of nodes and levels) may be fixed regardless of a size of the corresponding non-binary AST, so that one or more tokens of the source code element may be omitted from the complete binary AST, and/or so that a number of non-binary token nodes of the non-binary AST exceeds a number of binary AST token nodes of the complete binary AST.

Figure 7A:
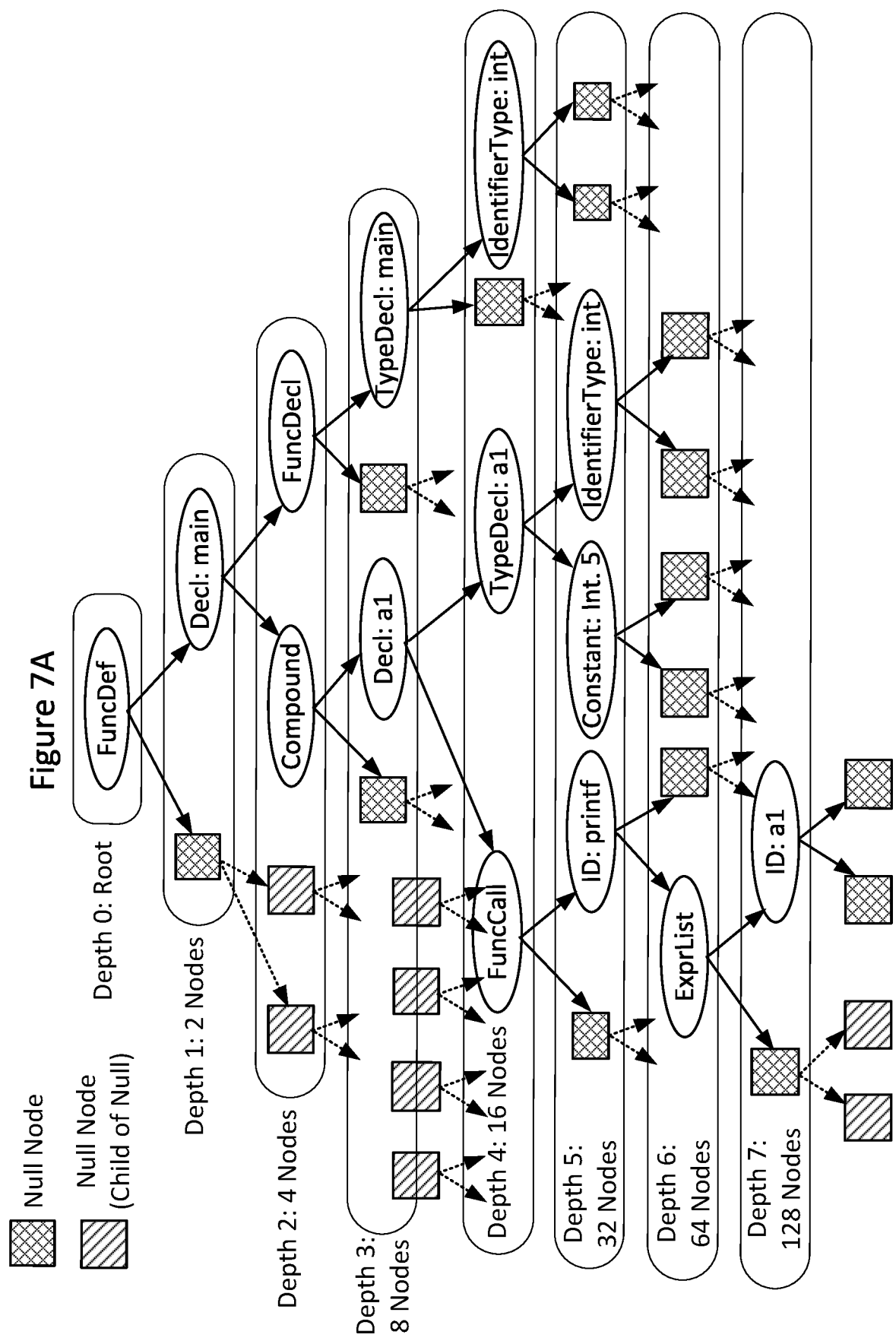
FIG. 7A is a diagram illustrating a binary AST of the source code element of FIG. 4A generated from the non-binary AST of FIG. 5 according to some embodiments of inventive concepts.

By way of example, FIG. 7A is a binary AST of the function 'main' given in FIGS. 3, 4A, and 4B.

FIG. 7A thus illustrates a complete binary AST of the regular non-binary AST illustrated in FIG. 5.

In a binary AST, token nodes (shown as ovals in FIG. 7A, also referred to as binary AST token nodes) correspond to the token nodes of the non-binary AST (also referred to as non-binary AST token nodes) and to the tokens of the source code element, and null nodes (shown as squares in FIG. 7A, also referred to as binary AST null nodes) are used to provide that each level i includes $2^i$ nodes and that each node in a level that is not the last level (level n) has two child nodes. In a complete binary AST that has a depth of n, the binary AST has levels i=0, 1, 2, . . . n (corresponding to depths 0, 1, 2, . . . n), each level i of the binary AST includes $2^i$ nodes, each node of levels i=0, 1, 2, . . . n−1 has 2 child nodes in a next level, the binary AST includes $\Sigma_0^n 2^i$ nodes, and the numeric array representation (of Operation 7) includes $\Sigma_0^n 2^i$ numeric values respectively corresponding to the $\Sigma_0^n 2^i$ nodes of the binary AST.

Operation 6 (Encoding to Numeric Values): In the obtained complete binary AST, nodes are named with words or text strings such as "FuncDef", "Decl", "TypeDecl", "Constant", "ID", and so on (corresponding to tokens of the source code element discussed above). These names are encoded into numeric values to allow them to be processed by ML algorithms. Therefore, these node names may be mapped into predetermined numerical values, where each numeric value for a node name may be provided as a numeric tuple. Examples of encodings from token names to numeric tuples are illustrated in the table of FIG. 7B by way of example.

In this encoding, a first number in the encoded numeric tuple represents the type of token, while second and third numbers in the numeric tuple can be used to provide auxiliary information that may exist at nodes. This encoding is just an example based on one embodiment. Notice that tokens as well as encoded numeric values may vary from one programming language to another language.

Operation 7 (Numeric Array Representation): Operation 7 may be the last operation. Notice that in a complete binary abstract syntax tree, the number of nodes that can exist at each depth (level) may be certain. For example, there can be at most 2 nodes at level-1, 4 nodes at level-2, 8 nodes at level-3, 16 nodes at level-4, and so on. The number of nodes that can exist at each level increases with the power of 2. Thus, at depth-k, there can be at most $2^k$ nodes. This determinism allows creation of a fixed length numeric array representation in which an index of elements can be assigned consistently to the nodes in binary AST, as illustrated in FIG. 8A, where FIG. 8A illustrates Converting a binary abstract syntax tree data structure to a numeric array representation.

Figures 8A, 8B:
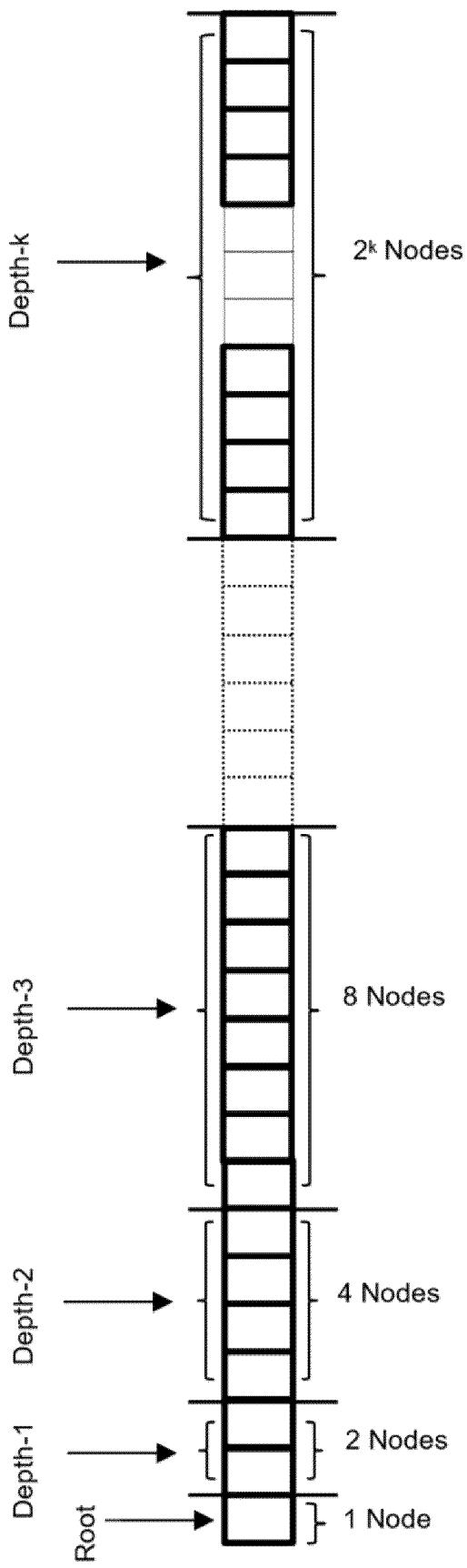
FIG. 8A illustrates conversion of a binary AST to a numeric array representation according to some embodiments of inventive concepts.
FIG. 8B illustrates the source code element of FIG. 4A used to generate the numeric array representation of FIG. 8C according to some embodiments of inventive concepts.
Figure 8C:
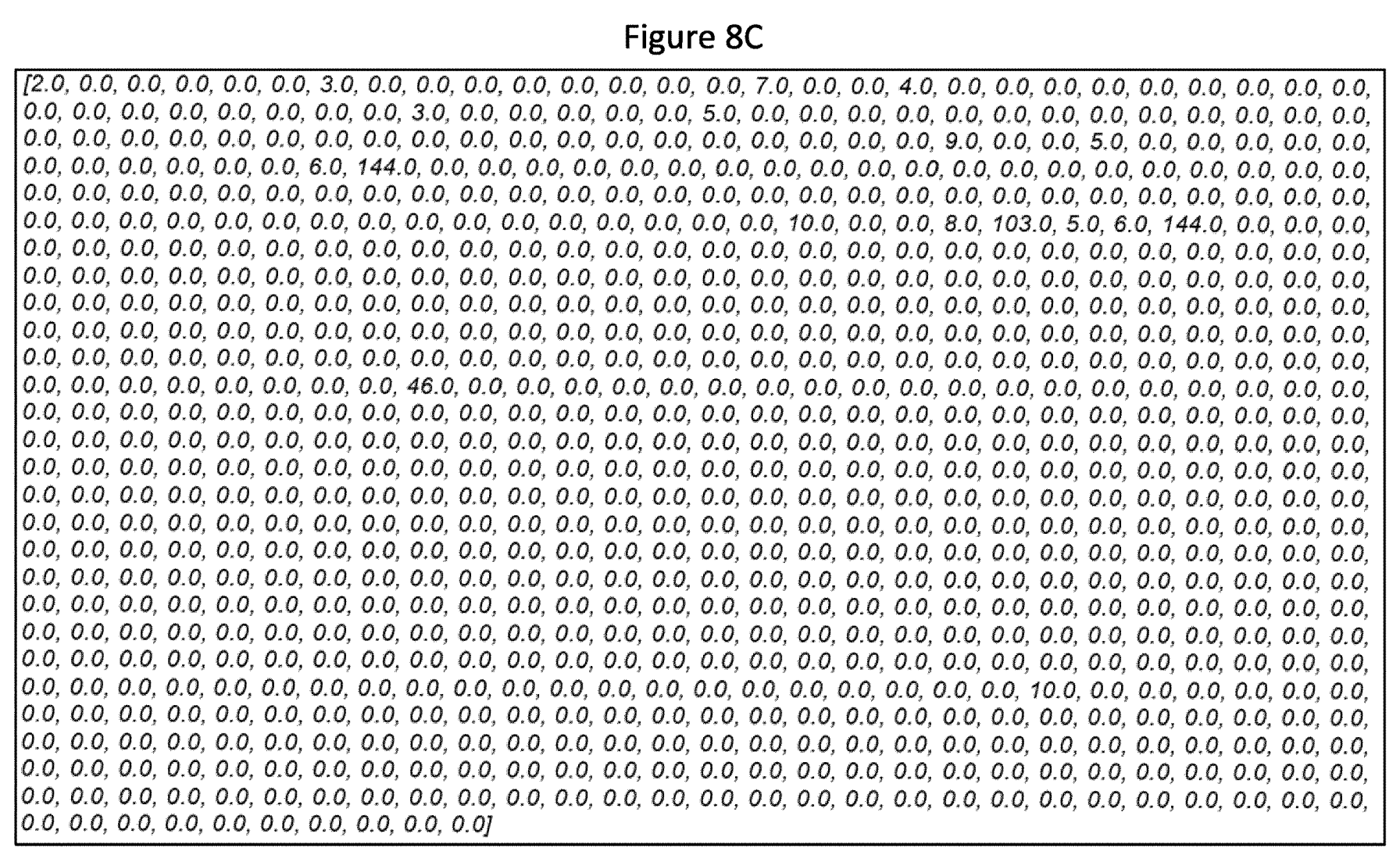

The main function given in FIG. 4A (reproduced as FIG. 8B) is converted to the numeric array representation of FIG. 8C.

FIG. 8C illustrates the numeric array representation of the source code element of the given function, up to Depth-10. By selecting a depth of 10 (i.e., n=10) for the binary AST, the binary AST will have 2047 nodes calculated as $\Sigma_0^n 2^i$. More generally, the number of nodes N can be calculated as:

$$N = \Sigma_0^n 2^i,$$

where: N is the number of nodes of the binary AST, n is the depth of the binary AST, and i represents each level from 0 to n.

According to some embodiments, of inventive concepts, one advantage of such a numeric array representation is that each particular index (location) of the numeric array representation represents/holds a feature (corresponding to a node of the corresponding binary AST), and these indexes are consistently associated with the same node in a binary AST. This may allow transfer of semantic information in the binary AST to the numeric array representation, which may be a useful property to make comparisons between binary ASTs of different source code elements and to extract patterns and hidden relations between nodes.

According to some embodiments, a use case may provide vulnerability Prediction for Source Code.

To show that proposed methods are feasible and useful to perform intelligent analysis on source code elements using ML techniques, the presented method was implemented and experiments were performed with the objective of predicting certain vulnerabilities in given source code elements. To do this, a public dataset (given in Reference [1] as Draper VDISC Dataset) was used that contains a relatively large number of function-level source code elements labelled with 5 different categories of vulnerabilities. The source code elements in this dataset were extracted from a Debian Linux distribution, Git repositories on GitHub and SATE IV Juilet Test Suite of NIST's Samate project, and then were exposed to static tool analysis and investigated by security experts to label them if they included pre-defined certain vulnerabilities or not. The investigated vulnerabilities are described below with respect to FIG. 9.

FIG. 9 illustrates the types of vulnerabilities (each referred to as a Common Weakness Enumeration or CWE) investigated in the experimental work with the number of samples in each class.

Methods according to some embodiments were implemented using a neural network model. Then, two different performance evaluation tests were performed on both (i) a balanced dataset (i.e. containing an identical number of positive and negative samples in training and test sets) and (ii) an imbalanced dataset (i.e. the number of positive samples is much higher than the number of negative samples, or vice versa, in the dataset). Experimental results are presented in the disclosure below.

Performance Evaluation on the Balanced Dataset is discussed below with respect to FIGS. 10 and 11.

In this part, a balanced subset was extracted from the original dataset referenced above, and its details are given in FIG. 10. FIG. 10 provides numbers of positive and negative samples in the balanced dataset that is obtained by under-sampling the original dataset. FIG. 11 provides the True Positive Rate and the False Positive Rate of the ML (neural network) implementation tested on Balanced Dataset according to some embodiments of inventive concepts.

Figure 11:
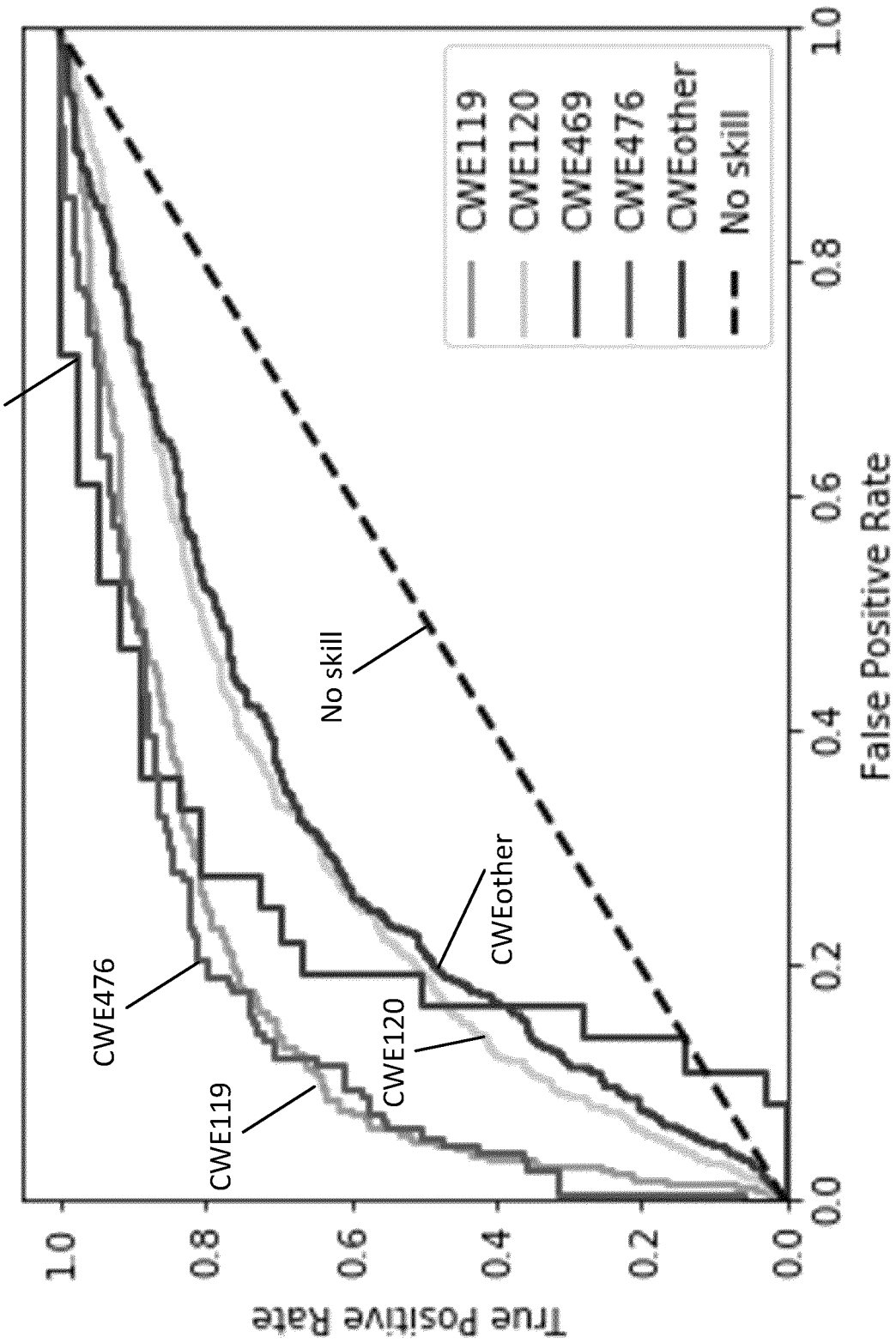
FIG. 11 is a graph illustrating performance using a trained ML model according to some embodiments of inventive concepts.

As shown in FIG. 11, the trained model performs well compared to No skill (random decision) for all classes, even though these are initial results without tuning hyperparameters to improve/optimize the model. These results show that the proposed source code representation method may be highly useful in the use case of vulnerability prediction from source code.

Figure 13:
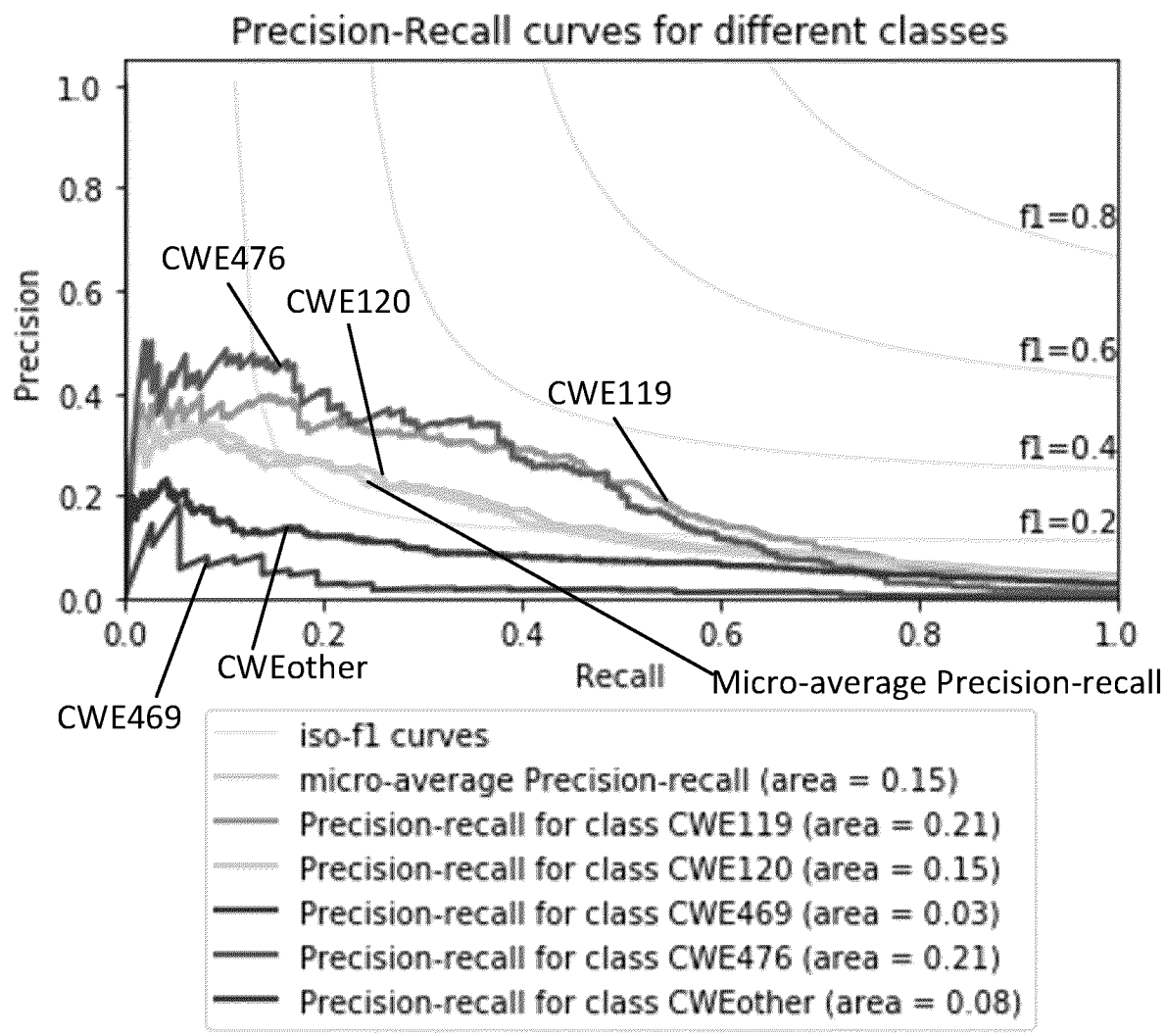
FIG. 13 is a graph illustrating performance using a trained ML model according to some embodiments of inventive concepts.

Performance Evaluation on Imbalanced Dataset is discussed with respect to FIGS. 12 and 13.

In this part, a subset of the original dataset is used with the details given in FIG. 12. FIG. 12 provides the numbers of positive and negative samples in the imbalanced dataset. FIG. 13 provides Precision-Recall curves for different classes tested on the Imbalanced Dataset.

FIG. 13 shows individual Precision-Recall PR curves for different classes. There are also underlying f1 score curves. While interpreting this figure, the ratio of positive and negative samples should be taken into consideration because it determines baseline.

According to some embodiments of inventive concepts, methods of source code representation for Machine Learning applications are provided.

According to some embodiments of inventive concepts, methods of translating a source code element into a numeric array representation are provided.

According to some embodiments of inventive concepts, methods of pre-processing a source code element before feeding into ML implementations are provided.

According to some embodiments of inventive concepts, methods of performing intelligent analysis directly on source code elements are provided.

According to some embodiments of inventive concepts, methods providing vulnerability prediction directly from source code elements are provided.

According to some embodiments of inventive concepts, methods of providing automated source code analysis without requiring any domain expert or hand-engineering are provided.

According to some embodiments of inventive concepts, methods of encoding tokens identified in lexical analyses of source code elements into numerical values are provided.

According to some embodiments of inventive concepts, methods of encoding a binary AST representation of a source code element into a numeric array representation are provided.

Operations of a source code evaluation node 1600 (implemented using the structure of FIG. 15) will now be discussed with reference to the flow chart of FIG. 16 according to some embodiments of inventive concepts. For example, modules may be stored in memory 1605 of FIG. 15, and these modules may provide instructions so that when the instructions of a module are executed by processing circuitry 1603, processing circuitry 1603 performs respective operations of the flow chart.

At block 1701, processing circuitry 1603 provides the source code of the programming language (e.g., a high-level programming language), wherein the source code includes a plurality of source code elements. Operations of block 1701, for example, may be performed as discussed above with respect to operation 1 of FIG. 14.

At block 1705, processing circuitry 1603 selects a first source code element (e.g., a function-level source code element) from the plurality of source code elements of the source code. According to some embodiments, the first source code element may include letters, characters, numbers, and operators. Operations of block 1705, for example, may be performed as discussed above with respect to operation 2 of FIG. 14.

At block 1709, processing circuitry 1603 generates a first plurality of tokens based on the first source code element, wherein each token of the first plurality of tokens comprises a sequence of text characters. According to some embodiments, the first plurality of tokens may be generated based on lexical analysis of the first source code element. Operations of block 1709, for example, may be performed as discussed above with respect to operation 3 of FIG. 14.

According to some embodiments, at block 1711, processing circuitry 1603 may generate a non-binary Abstract Syntax Tree (AST) representation of the first source code element based on the first plurality of tokens of the first source code element. The non-binary AST representation may include non-binary AST token nodes, and each of the non-binary AST token nodes may be based on a respective one of the first plurality of tokens of the first source code element. According to such embodiments, the binary AST representation of block 1715 may be generated based on the non-binary AST representation of block 1711, and each of the binary AST token nodes may correspond to a respective one of the non-binary AST token nodes. In such embodiments, a number of the non-binary AST token nodes may exceed a number of the binary AST token nodes. Operations of block 1711, for example, may be performed as discussed above with respect to operation 4 of FIG. 14.

At block 1715, processing circuitry 1603 generates a first binary Abstract Syntax Tree (AST) representation of the first source code element based on the first plurality of tokens of the first source code element, wherein the first binary AST representation comprises a first plurality of binary AST nodes including binary AST token nodes and binary AST null nodes, wherein each of the binary AST token nodes of the first binary AST representation is based on a respective one of the first plurality of tokens of the first source code element. Operations of block 1715, for example, may be performed as discussed above with respect to operation 5 of FIG. 14.

According to some embodiments, a number of the first plurality of tokens based on the source code may exceed a number of the binary AST token nodes of the first binary AST representation. For example, the binary AST representation may have a depth of n, the binary AST representation may have levels i=0, 1, 2, . . . n, each level i of the binary AST representation may include $2^i$ nodes, each node of levels i=0, 1, 2, . . . n−1 may have 2 child nodes in a next level, the binary AST representation may include $\Sigma_0^n 2^i$ nodes, and the numeric array representation may include $\Sigma_0^n 2^i$ numeric values respectively corresponding to the $\Sigma_0^n 2^i$ nodes of the binary AST representation. Accordingly, at least one of the first plurality of tokens generated based on the first source code element may be omitted from the binary AST representation.

At block 1719, processing circuitry 1603 encodes each of the binary AST token nodes and binary AST null nodes into a respective numeric value (e.g., a numeric tuple). Operations of block 1719, for example, may be performed as discussed above with respect to operation 6 of FIG. 14.

At block 1721, processing circuitry 1603 generates a first numeric array representation of the first source code element based on the first binary AST representation, wherein the first numeric values for the respective binary AST token nodes and binary AST null nodes are mapped to locations in the first numeric array representation based on respective locations of the binary AST token nodes and binary AST null nodes in the first binary AST representation. Operations of block 1721, for example, may be performed as discussed above with respect to operation 7 of FIG. 14.

Operations of blocks 1705, 1709, 1711, 1715, 1719, and/or 1721 may be repeated at block 1725 for each source code element of the source code. At block 1725, processing circuitry 1603 may determine if numeric array representations have been generated for all source code elements of the source code, and if not operations of blocks 1705, 1709, 1711, 1715, 1719, and/or 1721 may be repeated for a next source code element of the source code as discussed below.

According to some embodiments, at block 1705, processing circuitry 1603 may select a second source code element from the plurality of source code elements of the source code.

According to some embodiments, at block 1709, processing circuitry 1603 may generate a second plurality of tokens based on the second source code element, wherein each token of the second plurality of tokens comprises a sequence of text characters.

According to some embodiments, at block 1711, processing circuitry 1603 may generate a second non-binary Abstract Syntax Tree (AST) representation of the second source code element based on the second plurality of tokens of the second source code element. The second non-binary AST representation may include non-binary AST token nodes, and each of the non-binary AST token nodes of the second non-binary AST representation may be based on a respective one of the second plurality of tokens of the second source code element.

According to some embodiments, at block 1715, processing circuitry 1603 may generate a second binary Abstract Syntax Tree (AST) representation of the second source code element based on the second plurality of tokens of the second source code element, wherein the second binary AST comprises a second plurality of binary AST nodes including binary AST token nodes and binary AST null nodes, wherein each of the binary AST token nodes of the second binary AST is based on a respective one of the second plurality of tokens of the second source code element. According to such embodiments, the second binary AST representation of block 1715 may be generated based on the second non-binary AST representation of block 1711, and each of the binary AST token nodes of the second binary AST representation may correspond to a respective one of the non-binary AST token nodes. In such embodiments, a number of the non-binary AST token nodes of the second non-binary AST representation may exceed a number of the binary AST token nodes of the second binary AST representation.

According to some embodiments, at block 1719, processing circuitry 1603 may encode each of the token nodes and null nodes of the second plurality of binary AST nodes into a respective numeric value.

According to some embodiments at block 1721, processing circuitry 1603 may generate a second numeric array representation of the second source code element based on the second binary AST representation, wherein the numeric values for the respective token nodes and null nodes of the second plurality of binary AST nodes are mapped to locations in the second numeric array representation based on respective locations of the token nodes and null nodes in the second binary AST representation.

According to some embodiments at block 1725, processing circuitry 1603 may determine if numeric array representations have been generated for all source code elements of the source code. If not, operations of blocks 1705, 1709, 1711, 1715, 1719, and/or 1721 may be repeated at block 1725 for a next source code element of the source code. Otherwise, at block 1729, processing circuitry 1603 may evaluate the source code based on one or more of the numeric array representations of the respective source code elements using a machine learning (ML) model, wherein the ML model is based on a dataset of source code elements.

According to some embodiments, evaluation of block 1729 may include one or more of predicting a software vulnerability for the source code, detecting a vulnerability for the source code, identifying an error in the source code, and/or correcting an error in the source code using the ML model, wherein the ML model is based on the dataset of source code elements and at least one of corresponding respective vulnerabilities corresponding to the source code elements of the dataset and/or respective errors corresponding to the source code elements of the data set.

According to some embodiments, processing circuitry may evaluate each numerical array representation for each source code element using the ML model. For example, processing circuitry 1603 may evaluate the first source code element using the first numeric array representation and the ML model to predict a software vulnerability for the first source code element, detect a vulnerability for the first source code element, identify an error in the first source code element, and/or correct an error in the first source code element, and processing circuitry 1603 may evaluate the second source code element using the second numeric array representation and the ML model to predict a software vulnerability for the second source code element, detect a vulnerability for the second source code element, identify an error in the second source code element, and/or correct an error in the second source code element As shown in FIG. 16, numeric array representations may be generated for all source code elements of the source code before using the numeric array representations to evaluate the source code at block 1729. According to some other embodiments, each source code element may be evaluated using the respective numeric array representation before generating a next numeric array representation for a next source code element (e.g., moving block 1729 between blocks 1721 and 1725).

According to some embodiments, processing circuitry 1603 may generate an output (e.g., an output to be rendered on a video display) indicating at least one of a predicted software vulnerability for the first source code element, a detected vulnerability for the first source code element, an error in the first source code element, and/or a correction for the first source code element. According to some embodiments, processing circuitry 1603 may automatically generate (without user intervention) a corrected version of the first source code element responsive to evaluating the first source code element at block 1729, and processing circuitry 1603 may save the corrected version of the first source code element in memory 1605. According to some embodiments, processing circuitry 1603 may automatically generate (without user intervention) a corrected version of the first source code element responsive to evaluating the first source code element at block 1729, and processing circuitry 1603 may save a revised version of the source code including the corrected version of the first source code element in memory 1605.

Figure 16:
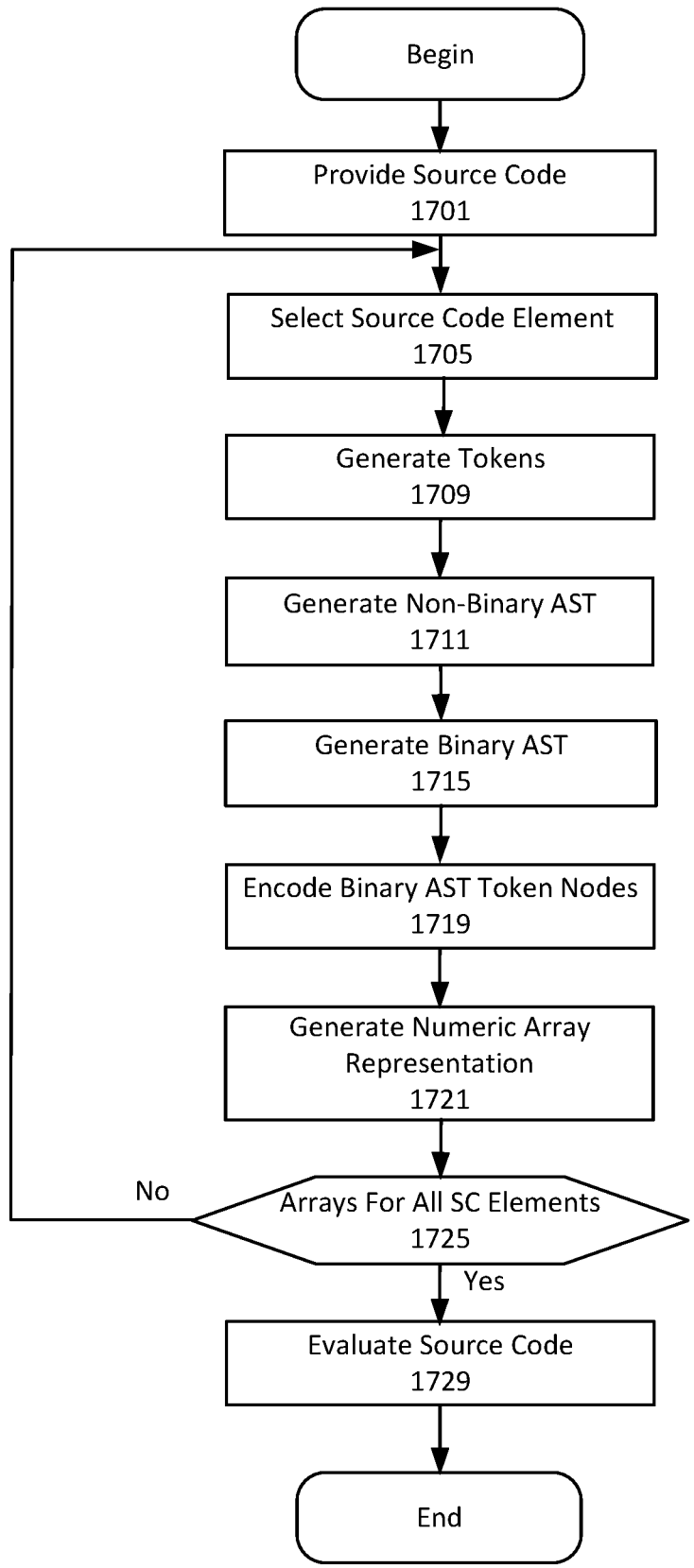
FIG. 16 is a flow chart illustrating operations of a source code evaluation node according to some embodiments of inventive concepts.

Various operations from the flow chart of FIG. 16 may be optional with respect to some embodiments of source code evaluation nodes and related methods. Regarding methods of some embodiments, for example, operations of blocks 1711, 1725, and/or 1729 of FIG. 16 may be optional.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein have been described with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Explanations are provided below for various abbreviations/acronyms used in the present disclosure.

| Abbreviation | Explanation |
| --- | --- |
| AI | Artificial Intelligence |
| AST | Abstract Syntax Tree |
| BoW | Bag-of-Words |
| CWE | Common Weakness Enumeration |
| ML | Machine Learning |
| NLP | Natural Learning Processing |
| PR | Precision-Recall |

References are identified below.

Reference [1] Russell, Rebecca & Kim, Louis & Hamilton, Lei & Lazovich, Tomo & Harer, Jacob & Ozdemir, Onur & Ellingwood, Paul & McConley, Marc. (2018). Automated Vulnerability Detection in Source Code Using Deep Representation Learning. 757-762. 10.1109/ICMLA.2018.00120.

The invention claimed is:

1. A method providing evaluation of source code of a programming language, the method comprising:
   providing the source code of the programming language, wherein the source code includes a plurality of source code elements;
   selecting a source code element from the plurality of source code elements of the source code;
   generating a plurality of tokens based on the source code element, wherein each token of the plurality of tokens comprises a sequence of text characters;

generating a binary Abstract Syntax Tree, AST, representation of the source code element based on the plurality of tokens of the source code element, wherein the binary AST representation comprises a plurality of binary AST nodes including binary AST token nodes and binary AST null nodes, wherein each of the binary AST token nodes is based on a respective one of the plurality of tokens of the source code element;

encoding each of the binary AST token nodes and binary AST null nodes into a respective numeric value; and generating a numeric array representation of the source code element based on the binary AST representation, wherein the numeric values for the respective binary AST token nodes and binary AST null nodes are mapped to locations in the numeric array representation based on respective locations of the binary AST token nodes and binary AST null nodes in the binary AST representation.

2. The method of claim 1 further comprising:

generating a non-binary Abstract Syntax Tree, AST, representation of the source code element based on the plurality of tokens of the source code element, wherein the non-binary AST representation comprises non-binary AST token nodes, where each of the non-binary AST token nodes is based on a respective one of the plurality of tokens of the source code element;

wherein generating the binary AST representation comprises generating the binary AST representation based on the non-binary AST representation, and wherein each of the binary AST token nodes corresponds to a respective one of the non-binary AST token nodes.

3. The method of claim 2, wherein a number of the non-binary AST token nodes exceeds a number of the binary AST token nodes.

4. The method of claim 1, wherein each of a number of the plurality of tokens based on the source code exceeds a number of the binary AST token nodes.

5. The method of claim 1, wherein the binary AST representation has a depth of n, wherein the binary AST representation has levels i=0, 1, 2, ... n, wherein each level i of the binary AST representation includes $2^i$ nodes, wherein each node of levels i=0, 1, 2, ... n−1 has 2 child nodes in a next level, wherein the binary AST representation includes $\Sigma_0^n 2^i$ nodes, and wherein the numeric array representation includes $\Sigma_0^n 2^i$ numeric values respectively corresponding to the $\Sigma_0^n 2^i$ nodes of the binary AST representation.

6. The method of claim 5, wherein at least one of the plurality of tokens generated based on the source code element is omitted from the binary AST representation.

7. The method of claim 1, wherein generating the plurality of tokens comprises generating the plurality of tokens based on lexical analysis of the source code element.

8. The method of claim 1, wherein the source code element comprises letters, characters, numbers, and operators.

9. The method of claim 1, wherein for each of the binary AST token nodes, the respective numeric value comprises a numeric tuple.

10. The method of claim 1 further comprising:

evaluating the source code based on the numeric array representation of the source code element using a machine learning, ML, model, wherein the ML model is based on a dataset of source code elements.

11. The method of claim 10, wherein evaluating comprises at least one of predicting a software vulnerability for the source code, detecting a vulnerability for the source code, identifying an error in the source code, and/or correcting an error in the source code using the ML model, wherein the ML model is based on the dataset of source code elements and at least one of corresponding respective vulnerabilities corresponding to the source code elements of the dataset and/or respective errors corresponding to the source code elements of the data set.

12. The method of claim 10, wherein the source code element is a first source code element, wherein the plurality of tokens is a first plurality of tokens, wherein the binary AST representation is a first binary AST representation, and wherein the plurality of binary AST nodes is a first plurality of binary AST nodes, the method further comprising:

selecting a second source code element from the plurality of source code elements of the source code;

generating a second plurality of tokens based on the second source code element, wherein each token of the second plurality of tokens comprises a sequence of text characters;

generating a second binary Abstract Syntax Tree, AST, representation of the second source code element based on the second plurality of tokens of the second source code element, wherein the second binary AST representation comprises a second plurality of binary AST nodes including binary AST token nodes and binary AST null nodes, wherein each of the binary AST token nodes of the second binary AST representation is based on a respective one of the second plurality of tokens of the second source code element;

encoding each of the token nodes and null nodes of the second plurality of binary AST nodes into a respective numeric value; and generating a second numeric array representation of the second source code element based on the second binary AST representation, wherein the numeric values for the respective token nodes and null nodes of the second plurality of nodes are mapped to locations in the second numeric array representation based on respective locations of the token nodes and null nodes in the second binary AST representation;

wherein evaluating the source code comprises evaluating the source code based on the first numeric array representation of the first source code element and the second numeric array representation of the second source code element.

13. A source code evaluation node comprising:

processing circuitry; and memory coupled with the processing circuitry, wherein the memory includes instructions that when executed by the processing circuitry causes the source code evaluation node to:

provide source code of a programming language, wherein the source code includes a plurality of source code elements, select a source code element from the plurality of source code elements of the source code, generate a plurality of tokens based on the source code element, wherein each token of the plurality of tokens comprises a sequence of text characters, generate a binary Abstract Syntax Tree, AST, representation of the source code element based on the plurality of tokens of the source code element, wherein the binary AST representation comprises a plurality of binary AST nodes including binary AST token nodes and binary AST null nodes, wherein each of the binary AST token nodes is based on a respective one of the plurality of tokens of the source code element, encode each of the binary AST token nodes and binary AST null nodes into a respective numeric value, and generate a numeric array representation of the source code element based on the binary AST representation, wherein the numeric values for the respective binary AST token nodes and binary AST null nodes are mapped to locations in the numeric array representation based on respective locations of the binary AST token nodes and binary AST null nodes in the binary AST representation.

14. The source code evaluation node of claim 13, wherein the memory further includes instructions that when executed by the processing circuitry causes the source code evaluation node to, generate a non-binary Abstract Syntax Tree, AST, representation of the source code element based on the plurality of tokens of the source code element, wherein the non-binary AST representation comprises non-binary AST token nodes, where each of the non-binary AST token nodes is based on a respective one of the plurality of tokens of the source code element;

wherein generating the binary AST representation comprises generating the binary AST representation based on the non-binary AST representation, and wherein each of the binary AST token nodes corresponds to a respective one of the non-binary AST token nodes.

15. The source code evaluation node of claim 14, wherein a number of the non-binary AST token nodes exceeds a number of the binary AST token nodes.

16. The source code evaluation node of claim 13, wherein each of a number of the plurality of tokens based on the source code exceeds a number of the binary AST token nodes.

17. The source code evaluation node of claim 13, wherein the binary AST representation has a depth of n, wherein the binary AST representation has levels i=0, 1, 2, ... n, wherein each level i of the binary AST representation includes $2^i$ nodes, wherein each node of levels i=0, 1, 2, ... n−1 has 2 child nodes in a next level, wherein the binary AST representation includes $\Sigma_0^n 2^i$ nodes, and wherein the numeric array representation includes $\Sigma_0^n 2^i$ numeric values respectively corresponding to the $\Sigma_0^n 2^i$ nodes of the binary AST representation.

18. The source code evaluation node of claim 17, wherein at least one of the plurality of tokens generated based on the source code element is omitted from the binary AST.

19. The source code evaluation node of claim 13, wherein generating the plurality of tokens comprises generating the plurality of tokens based on lexical analysis of the source code element.

20. The source code evaluation node of claim 13, wherein the source code element comprises letters, characters, numbers, and operators.

21. The source code evaluation node of claim 13, wherein for each of the binary AST token nodes, the respective numeric value comprises a numeric tuple.

22. The source code evaluation node of claim 13, wherein the memory further includes instructions that when executed by the processing circuitry causes the source code evaluation node to, evaluate the source code based on the numeric array representation of the source code element using a machine learning, ML, model, wherein the ML model is based on a dataset of source code elements.

23. The source code evaluation node of claim 22, wherein evaluating comprises at least one of predicting a software vulnerability for the source code, detecting a vulnerability for the source code, identifying an error in the source code, and/or correcting an error in the source code using the ML model, wherein the ML model is based on the dataset of source code elements and at least one of corresponding respective vulnerabilities corresponding to the source code elements of the dataset and/or respective errors corresponding to the source code elements of the data set.

24. The source code evaluation node of claim 22, wherein the source code element is a first source code element, wherein the plurality of tokens is a first plurality of tokens, wherein the binary AST representation is a first binary AST representation, and wherein the plurality of nodes is a first plurality of nodes, and wherein the memory further includes instructions that when executed by the processing circuitry causes the source code evaluation node to, select a second source code element from the plurality of source code elements of the source code;

generate a second plurality of tokens based on the second source code element, wherein each token of the second plurality of tokens comprises a sequence of text characters;

generate a second binary Abstract Syntax Tree, AST, representation of the second source code element based on the second plurality of tokens of the second source code element, wherein the second binary AST representation comprises a second plurality of binary AST nodes including binary AST token nodes and binary AST null nodes, wherein each of the binary AST token nodes of the second binary AST representation is based on a respective one of the second plurality of tokens of the second source code element;

encode each of the token nodes and null nodes of the second plurality of binary AST nodes into a respective numeric value; and generate a second numeric array representation of the second source code element based on the second binary AST representation, wherein the numeric values for the respective token nodes and null nodes of the second plurality of nodes are mapped to locations in the second numeric array representation based on respective locations of the token nodes and null nodes in the second binary AST representation;

wherein evaluating the source code comprises evaluating the source code based on the first numeric array representation of the first source code element and the second numeric array representation of the second source code element.

* * * * *